United States Patent
Loinaz

(10) Patent No.: US 8,000,412 B1
(45) Date of Patent: Aug. 16, 2011

(54) LOW POWER SERIAL LINK

(75) Inventor: Marc Loinaz, Palo Alto, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 957 days.

(21) Appl. No.: 11/756,139

(22) Filed: May 31, 2007

Related U.S. Application Data

(60) Provisional application No. 60/810,226, filed on Jun. 1, 2006.

(51) Int. Cl.
*H03K 5/159* (2006.01)

(52) U.S. Cl. .................. 375/330; 375/242; 375/244

(58) Field of Classification Search .............. 375/354
See application file for complete search history.

(56) References Cited

U.S. PATENT DOCUMENTS

| | | | |
|---|---|---|---|
| 5,943,382 A * | 8/1999 | Li et al. ................. | 375/376 |
| 6,788,103 B1 * | 9/2004 | Feldman et al. ......... | 326/34 |
| 7,009,425 B1 * | 3/2006 | Loinaz et al. ........... | 326/83 |
| 7,521,976 B1 * | 4/2009 | Sudjian et al. .......... | 327/199 |
| 7,551,651 B1 * | 6/2009 | Yen ....................... | 370/537 |
| 7,590,210 B2 * | 9/2009 | Aweya et al. ............ | 375/356 |
| 2003/0081803 A1 * | 5/2003 | Petilli et al. ............ | 381/314 |
| 2003/0185308 A1 * | 10/2003 | Schoenborn ............ | 375/257 |
| 2005/0191061 A1 * | 9/2005 | Liu et al. ................ | 398/188 |
| 2006/0132168 A1 * | 6/2006 | Yang et al. ............. | 326/6 |
| 2007/0041483 A1 * | 2/2007 | Iwata et al. ............ | 375/374 |
| 2007/0243851 A1 * | 10/2007 | Shoarinejad et al. .... | 455/343.2 |
| 2009/0097864 A1 * | 4/2009 | Kershteyn .............. | 398/188 |
| 2009/0115472 A1 * | 5/2009 | Pfaff et al. ............. | 327/156 |

* cited by examiner

*Primary Examiner* — Chieh M Fan
*Assistant Examiner* — Santiago Garcia
(74) *Attorney, Agent, or Firm* — Stattler-Suh PC

(57) ABSTRACT

The present invention relates to a low power serial link employing differential return-to-zero signaling. A receiver circuit consistent with some embodiments includes an input circuit for receiving differential serial data signals that form a differential return-to-zero signaling and a clock recovery circuit. The clock recovery circuit is coupled to the input circuit and includes a logic gate configured to generate a clock signal by using said differential serial data signals.

23 Claims, 7 Drawing Sheets

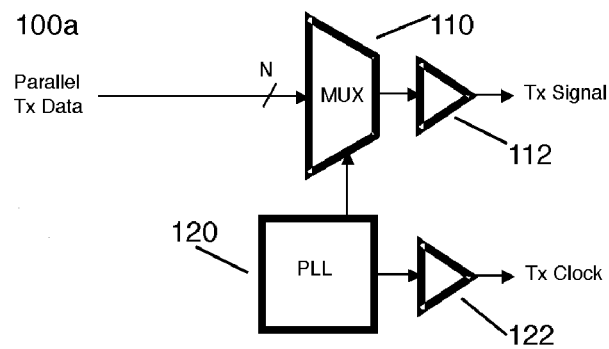
FIG. 1A -- prior art
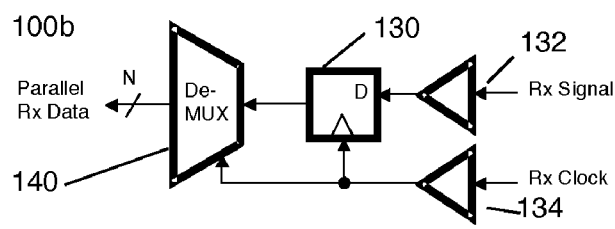
FIG. 1B -- prior art
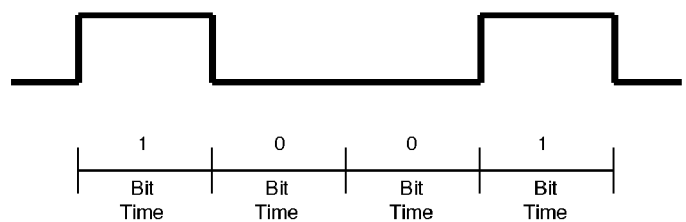
FIG. 2 -- prior art

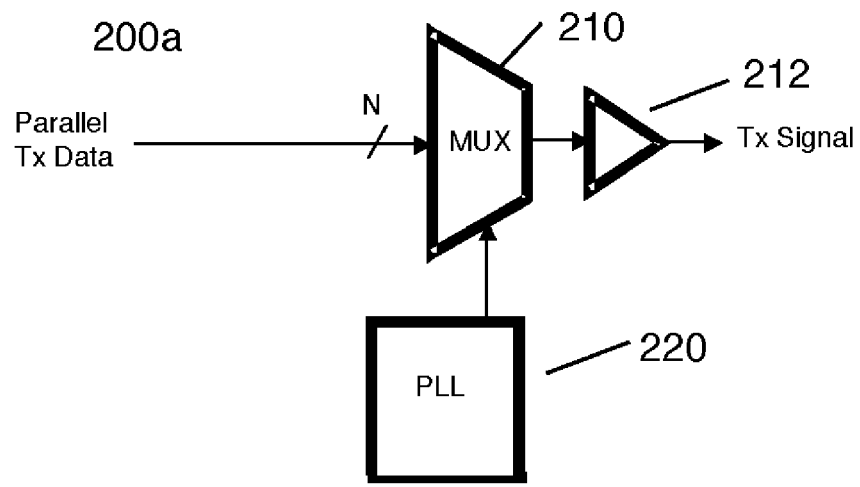
FIG 3A -- prior art
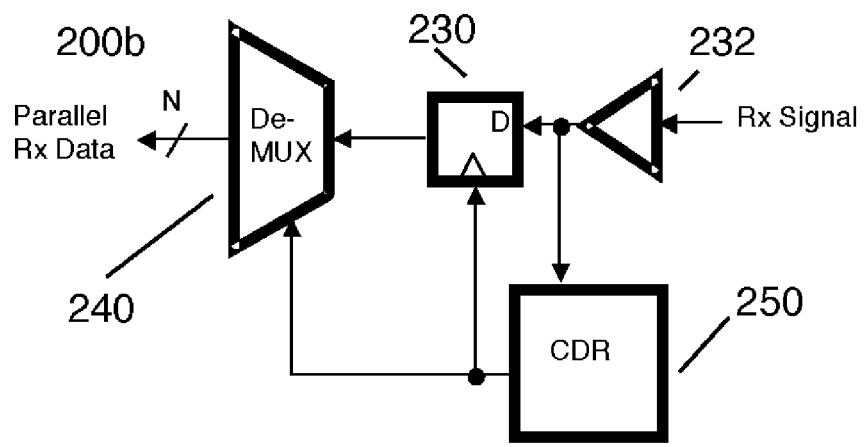
FIG. 3B -- prior art

1010 — receiving differential serial data bit streams comprising a differential return-to-zero signaling 1020 — executing an OR logic operation between said differential serial data bit streams so as to recover a clock from said differential serial data bit streams

FIG. 10

LOW POWER SERIAL LINK

RELATED APPLICATIONS

This application claims benefit of priority under 35 U.S.C. §119(e) of U.S. Provisional Patent Application Ser. No. 60/810,226, filed Jun. 1, 2006 and entitled "Low power serial link", which is hereby incorporated by reference.

BACKGROUND OF THE INVENTION

1. Field of the Invention

The present invention relates to data communications, and more particularly to a low power serial link.

2. Art Background

Continuing advances in consumer electronics and computing technologies are driving the need for high-speed communications links between silicon chips. While high-speed links have been traditionally used in network switching, as described by "Clause 47: XGMII Extender Sublayer (XGXS) and 10 Gigabit Attachment Unit Interface (XAUI)", *Part 3: Carrier Sense Multiple Access with Collision Detection (CSMA/CD) Access Method and Physical Layer Specifications*, IEEE 802.3ae, August 2002; and in high-performance computing applications, as described by *PCI Express Base Specification Revision 1.0a*, PCI-SIG, April 2003, there is an increasing need for high-speed links in mobile consumer electronic devices. For example, in mobile phones there is a need for communication between the digital signal processor (DSP) and the liquid crystal display (LCD) driver chip and between the DSP and the camera module. With improvements in the resolution (i.e. number of pixels) in the LCD and camera comes a need for increased data rates in the chip-to-chip links.

High-speed chip-to-chip communications can be performed using many parallel input and output (I/O) drivers each operating at a relatively slow rate or using a small number of I/O drivers operating at a higher rate. In general the number of pads available on a chip for high-speed chip-to-chip communication is limited by a host of factors including package size, requirements for power supply pads, and printed circuit board space. In portable electronics applications, where space is at a premium, the use of faster links with fewer lines is advantageous. Thus, serial-type architectures are increasingly being used in such devices.

Further, low power dissipation is desirable in most electronics applications because it reduces the need for heat dissipation and cases power supply design. However, power is especially important in mobile applications, where battery life must be maximized and battery weight minimized. Internal communications structures can be a major source of power dissipation, thus, low power chip-to-chip links are especially desirable in mobile applications.

Hence, a low power serial structure with low power dissipation and a small footprint is a desirable internal communications structure for a portable device. A number of conventional designs attempt to provide such a structure, but each has several drawbacks.

For instance, a block diagram of a conventional low-power serial receiver/transmitter pair is shown in FIGS. 1A and 1B. This pair is representative of the link embodied in a Fairchild Semiconductor device described in "FIN12AC μSerDes Low Voltage 12-Bit Bi-Directional Serializer/Deserializer with Multiple Frequency Ranges", Fairchild Semiconductor Corporation Datasheet.

In the transmit portion 100a, input data, "Parallel Tx Data", to be transmitted on the serial link are fed into a multiplexer (MUX) 110 and then driven off-chip by an output driver circuit 112 to produce an output signal "Tx Signal". Clocks required by MUX 110 are generated using a phase-locked loop (PLL) 120. A transmit clock is driven along with the data by a separate clock driver circuit 122. The clock, "Tx clock" provides timing to the receiver at the other end of the link. The data is usually driven using binary, non-return-to-zero (NRZ) signaling as shown in FIG. 2. While binary, single-ended signaling is shown, combinations of differential signaling and multi-level signaling can also be used.

In the receiver portion 100b, the "Tx Signal" is received as "Rx Signal" and the "Tx Clock" is received as "Rx Clock". The "Rx Signal" is retimed using "Rx Clock". A data receiver circuit 132 receives the "Rx Signal" and a clock receiver circuit 134 receives the "Rx Clock". A retiming circuit 130 then retimes the "Rx Signal" data using the "Rx Clock", and provides the retimed data to an output de-multiplexer (De-MUX) 140. The DeMUX 140 uses the received clock to present the data in a low speed (relative to the serial link speed), parallel format as "Parallel Rx Data".

With the use of the architecture in FIGS. 1A and 1B, two signals (clock and data) have to be routed in each direction, resulting in a power dissipation and printed circuit board area penalty.

A second conventional serial link architecture is shown in FIGS. 3A and 3B. This architecture is representative of the transmitter and receiver pair described in "THCV213 and THCV214 LVDS SerDes Transmitter and Receiver", THine Electronics Datasheet.

In this architecture the transmitter does not send a clock along with the data. In the transmit portion 200a, input data, "Parallel Tx Data", to be transmitted on the serial link are fed into a multiplexer (MUX) 210 and then driven off-chip by an output driver circuit 212 to produce an output signal "Tx Signal". Clocks required by MUX 210 are generated using a phase-locked loop (PLL) 220. No transmit clock is driven along with the data. Instead, timing is recovered at the receiver.

In the receiver portion 200b, the "Tx Signal" is received as "Rx Signal". A data receiver circuit 232 receives the "Rx Signal". A clock-and-data recovery (CDR) circuit 250, which is a specialized form of PLL, is used to recover a clock that is synchronous with the received serial data signal "Rx Signal". The recovered clock from the CDR 250 is provided to both the retiming circuit 230 and to the output de-multiplexer (De-MUX) 240. The retiming circuit 230 uses the recovered clock to retime the input data and provides the retimed data to the output DeMUX 240. The output DeMUX 240 also receives the recovered clock and uses the clock to present the received data in a low speed (relative to the serial link speed), parallel format as "Parallel Rx Data".

In FIGS. 3A and 3B, the elimination of the transmit clock driver results in power savings. However a CDR is generally expensive in terms of power dissipation and chip area, as described in, Y. Greshishchev et al, "A Fully-Integrated SiGe Receiver IC for 10 Gb/s Data Rate", *IEEE Journal of Solid-State Circuits*, December 2000. Furthermore, with NRZ signaling the CDR is implemented using a control loop that is, in general, complicated to design. A tradeoff must be made among the following factors: (1) tracking capability of the CDR in the presence of input signal phase jitter, (2) CDR loop stability, and (3) the variation of CDR loop dynamics over variations in the integrated circuit manufacturing process, power supply voltage, and chip temperature.

SUMMARY OF THE DISCLOSURE

Some embodiments of the present invention relate to receiver circuits. For example, a receiver circuit consistent with some embodiments comprises an input circuit for receiving differential serial data signals that form a differential return-to-zero signaling and a clock recovery circuit. The clock recovery circuit is coupled to said input circuit and includes a logic gate configured to generate a clock signal by using said differential serial data signals. Preferably, the differential serial data signals received are formed of a data bit stream and the clock signal is used to generate a recovered data bit stream from the differential serial data signals.

Embodiments of the present invention are preferably implemented in integrated circuits (IC). For example, consistent with some embodiments, a transmit/receive pair of ICs comprises a first integrated circuit chip and a second integrated circuit chip.

The first IC chip comprises a transmitter for receiving data and for generating differential serial data signals that form a differential return-to-zero signaling.

The second IC chip comprises an input circuit for receiving said differential serial data signals and a clock recovery circuit coupled to said input circuit. The clock recovery circuit comprises a logic gate for generating a clock signal by using said differential return-to-zero signaling. Preferably the differential serial data signals are formed from the data received by the first IC chip. Further, the data received is preferably in the form of a data bit stream. Also preferably, either in the second IC chip or in another IC chip, the clock signal is used to generate a recovered data bit stream from the differential serial data signals.

Some embodiments of the present invention are implemented in master/slave systems of chips. For example, a system comprising a master circuit and a plurality of slave circuits wherein master and slave circuits each communicate via serial architecture consistent with the present invention.

In some embodiments a master circuit comprises a plurality of transceiver circuits to transmit and receive differential serial data signals that form a differential return-to-zero signaling over a plurality of serial links. The master circuit comprises a single phase-locked loop to generate timing signals for the transceiver circuits. Preferably the master circuit is configured to receive a data bit stream and to form the differential serial data signals of the data bit stream.

The master-circuit system further includes a plurality of slave circuits. Each slave circuit comprises an input circuit for receiving said differential serial data signals and a clock recovery circuit. Each clock recovery circuit is coupled to the input of its slave circuit and comprises a logic gate for generating a clock signal by using the differential return-to-zero signaling of the differential serial data signals. Preferably the clock signal is used to form a recovered data bit stream of the differential serial data signals.

Some embodiments of the present invention include methods related to low power serial links that use differential serial data. For example, some embodiments relate to methods of recovering a clock from serial data. One such method comprises steps of: receiving differential serial data signals that form a differential return-to-zero signaling, and executing an OR logic operation between said differential serial data signals so as to recover a clock from said differential serial data signals. Preferably the differential serial data signals received are formed from a data bit stream and the clock recovered is used to form a recovered data bit stream from the differential serial data signals.

Further, some methods relate to providing data and timing over a serial link and decoding said data. One such method comprises steps performed on a transmit side and a receive side. The transmit side performs the steps: receiving data, generating a transmit clock signal, encoding the data into a plurality of differential serial data signals, and providing the plurality of differential serial data signals over a serial link to a receiver. The plurality of differential serial data signals form a differential return-to-zero signaling and timed by the transmit clock signal.

The receive side performs the steps of receiving said differential serial data signals and executing an OR logic operation between said differential serial data signals so as to recover a clock from said differential serial data signals. Preferably the clock recovered is used to form a recovered data bit stream of the differential serial data signals.

DISCRIPTION OF THE FIGURES

FIG. 1A illustrates a transmit portion of a conventional serial architecture that requires routing of both data and clock.

FIG. 1B illustrates a receive portion of a conventional serial architecture that requires routing of both data and clock.

FIG. 2 illustrates non-return-to-zero (NRZ) signaling as typically used in the architecture of FIGS. 1A and 1B.

FIG. 3A illustrates a transmit portion of at conventional serial architecture that employs a clock-and-data recovery (CDR) circuit.

FIG. 3B illustrates a receive portion of a conventional serial architecture that employs a clock-and-data recovery (CDR) circuit.

DETAILED DESCRIPTION

Signaling

Figure 4:
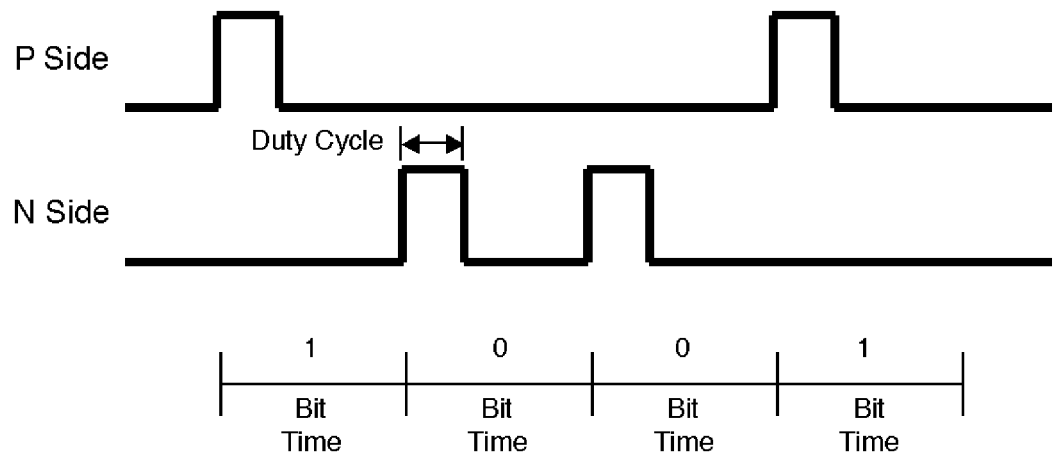
FIG. 4 illustrates a proposed differential return-to-zero (RZ) signaling consistent with some embodiments of the present invention.

Embodiments of the present invention comprise serial links making use of differential return-to-zero (RZ) signaling as shown in FIG. 4. A fixed signaling duty cycle (not necessarily 50% of the bit time) is used.

As shown in FIG. 4, some embodiments of the present invention employ differential return-to-zero signaling that transmit high bits (i.e. 1's) on one line of a differential link and low bits (i.e. 0's) on another. In FIG. 4, high bits are transmitted on the P Side, while low bits are transmitted on the N Side. The transmission is clocked across the entire differential signal, though each line is only active for its type of bit. This facilitates clock reconstruction as the transmit timing is proportional to the superposition of all transmission signals.

Figure 5:
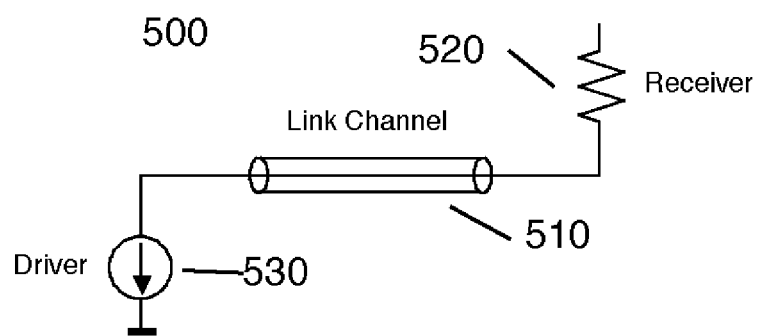
FIG. 5 illustrates far-end termination as preferably employed within the embodiments of the present invention.

Preferably embodiments of the present invention employ RZ signaling, as in FIG. 4, and far-end termination, depicted in FIG. 5. In the exemplary link 500, a driver 530 provides signals to the receiver 520 across a link channel 510. As shown, the receiver 520 provides impedance necessary to terminate the link line.

Due to the nature of the differential data, with far-end termination current flows across the terminating impedance of the receiver 520 only during a portion of each bit time. Because the differential timing in the present invention allows for signaling duty cycles of less than 50% of the bit time, the proportion of transmit time for which current flows can be quite low. This arrangement provides a reduction in power dissipation relative to NRZ signaling.

Clock and Data Recovery

Another advantage of differential RZ signaling is that clock recovery can be greatly simplified relative to NRZ signaling. Preferably a simple logic-gate-like circuit, such as an OR gate is used to recover the clock without the use of a traditional CDR phase-locked loop. Such a clock recovery circuit is typically much easier to design and dissipate less power. However, note that a CDR circuit could still be used with the differential RZ signaling method.

Figure 6:
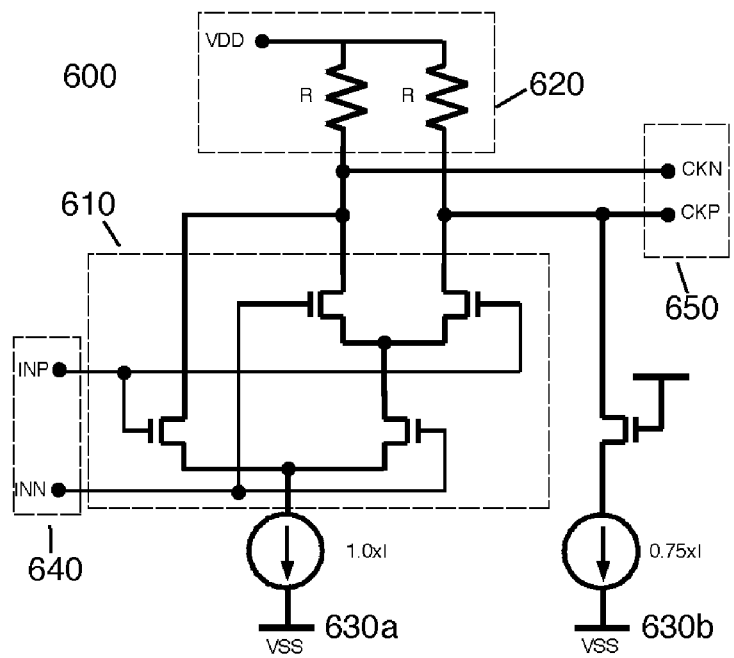
FIG. 6 illustrates a clock recovery circuit consistent with sonic embodiments of the present invention.
Figure 7:
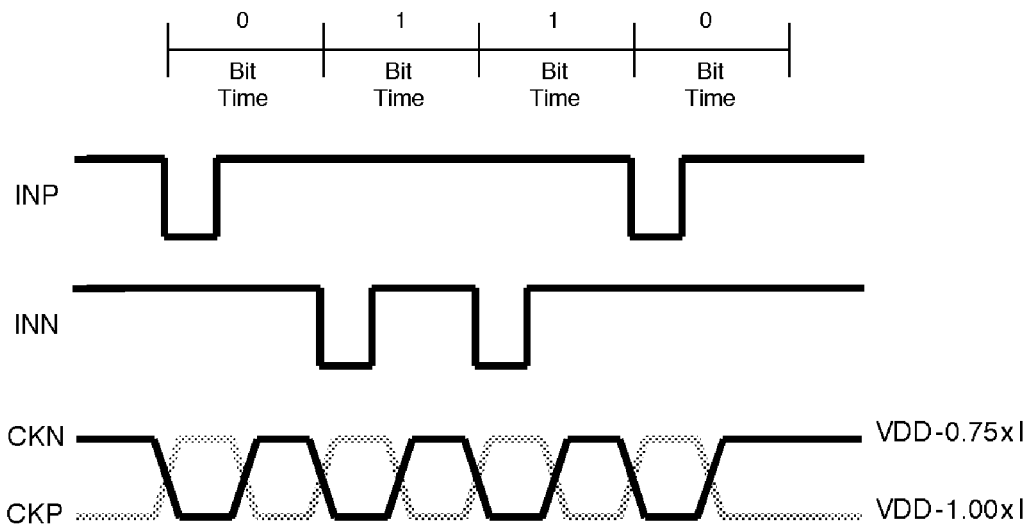
FIG. 7 illustrates waveforms consistent with clock recovery in some embodiments of the present invention and associated with the clock recovery circuit of FIG. 6.

One possible circuit for performing clock recovery is shown in FIG. 6 with associated waveforms depicted in FIG. 7. Note that this circuit does not require the feedback loop associated with conventional CDR circuits.

In the clock recovery circuit 600 of FIG. 6, differential data is received at the inputs 640. This data is fed to the logic-gate like circuit 610. The logic-gate like circuit 610 in combination with the drivers 630a and 630b modulate the supply voltage 620 to produce a clock signal pair at the output 650. In essence, the clock signal pair CKN and CKP is a reconstruction of a clock provided at the input 640.

As illustrated the logic-gate like circuit 620 is a logical OR operating on the inputs 640. As shown by FIG. 7, a high signal on either INP or INN pulls CKN low and pushes CKP high, while no signal lets CKP stay low and CKN stay high. Because the transmission is timed across both P and N inputs this superposition of the two signals produces a clock at the output 650. However, the clock produced by the recovery circuit 600 has a duty cycle determined by that of the differential signal.

While the circuit of FIG. 6 is a simple implementation of a clock recovery circuit for differential RZ signaling, it is possible that other clock recovery circuits can be devised.

Once the clock has been recovered using the circuit of FIG. 6 the RZ data is preferably recovered. Some embodiments of the present invention employ an integrate-and-dump (ID) circuit to this end. A description of integrate and dump circuits is given by S. Sidiropoulos and M. Horowitz, "A 700-Mb/s/pin CMOS signaling interface using current integrating receivers," *IEEE Journal of Solid-State Circuits*, May 1997.

Figure 8:
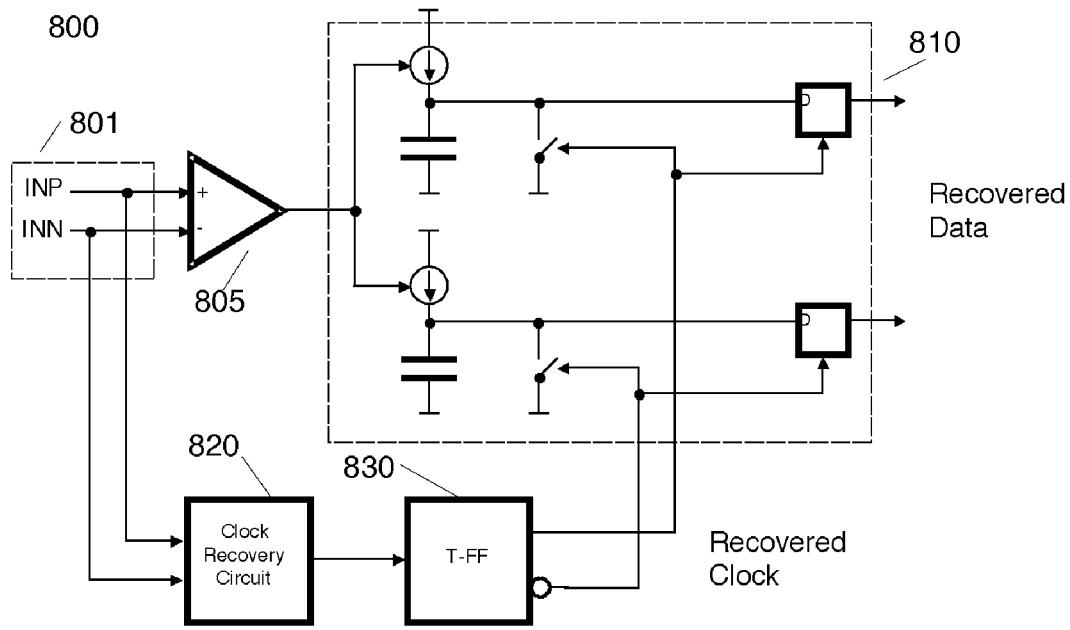
FIG. 8 illustrates a clock and data recovery solution consistent with some embodiments of the present invention.

Preferably a clock recovery circuit and integrate-and-dump are used in conjunction with a T-flip-flop (divide-by-two circuit) as shown in FIG. 8.

The clock and data recovery circuit 800 of FIG. 8 employs a clock recovery circuit 820, an integrate-and-dump (ID) circuit 810, and a T-flip-flop 830. The circuit 800 receives differential data at 801 and provides it to both the clock recovery circuit 820 and to the differential amplifier 805. Preferably the clock recovery circuit 820 operates as described above; however, note that the clock recovery circuit may produce a clock that does not have a 50% duty cycle (the duty cycle of the clock depends on that of the differential data).

The differential amplifier 805 produces a positive pulse when a "1" is received. A negative pulse is produced when a "0" is received. The pulses at the output of the differential amplifier are provided to the ID circuit 810.

In the ID circuit 810, the positive or negative pulses form positive or negative voltage across the integrating capacitors. As shown, the voltage signal across each capacitor is sampled using a flip-flop timed by the recovered clock output of the T flip-flop 830. Note that while the clock recovery circuit may produce at output signal that does not have 50% duty cycle, the output of the T-flip-flop 830 will have a nominal duty cycle of 50% at half the input data rate. Each flip-flop will produce a "1" if it samples a positive value and a "0" if it samples a negative value. This sampling, timed by the recovered clock from the T flip-flop 830, produces de-multiplexed, recovered data.

System Architecture

Figure 9:
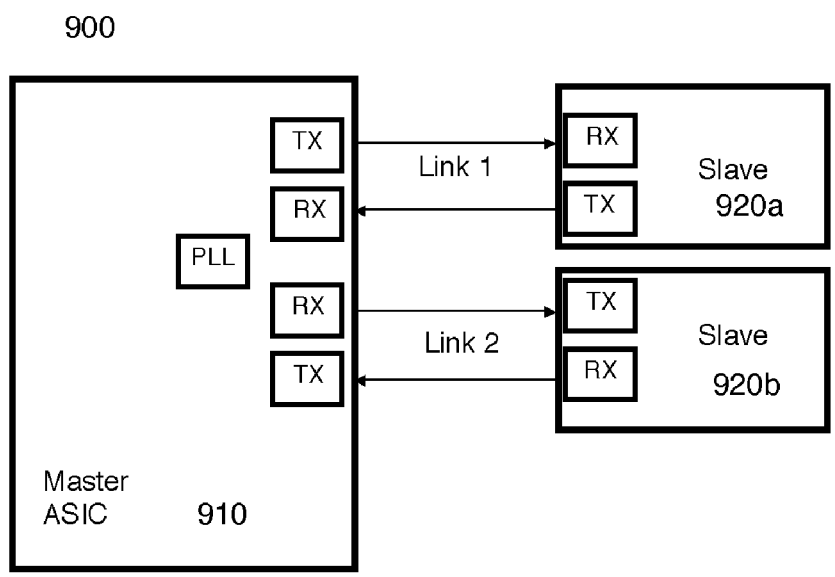
FIG. 9 illustrates a system employing a low power serial link consistent with some embodiments of the present invention.

FIG. 9 shows the block diagram of a system 900 making use of the low-power serial link technology described in this disclosure. Each link is a point-to-point link. However, other implementations are possible where a multi-drop bus architecture can be used. In a mobile phone application, the master ASIC may control two or more slaves, including an LCD display and a digital camera.

In the system 900 the Master application specific integrated circuit (ASIC) 910 includes a phase-locked loop PLL, as well as two transmit/receive TX/RX pairs. One TX/RX pair communicates on Link 1 with Slave 920a. Slave 920a includes an RX/TX pair configured to communicate on Link 1. A second TX/RX pair of the Master ASIC 910 is configured to communicate on Link 2 with Slave 920b, which also includes an RX/TX pair.

Note that in order to transmit data on a link, a PLL is required to generate the clocks required to time the transmit signal. As in the system 900, this PLL may be shared by multiple link circuits on a master ASIC since PLL circuits are generally expensive in terms of power dissipation and die area. Since implementation of clock recovery is straightforward with differential RZ signaling, the transmitter on a slave device may be clocked using the recovered clock from the received on the same device. This eliminates the need for a PLL circuit on the slave devices.

Note that in differential RZ signaling, as described in previous subsections, transmission of a "1" or "0" involves a pulse on either line in a link differential pair. Other forms of signaling involving high values on both lines and low values on both lines can be used to signal a slave device to go into low-power mode or to "wake up" a slave device that is in low-power mode. For example, holding both the P and N line high for more than a set time period can be a signal to the slave to go into sleep mode. Holding both the P and N line low for more than y seconds can be a signal for the slave to wake up from sleep mode. Other methods may be devised for a two stations on either side of a link to perform a data rate negotiation (i.e. determine the fastest line rate at which both stations can function).

Methods

Figure 11:
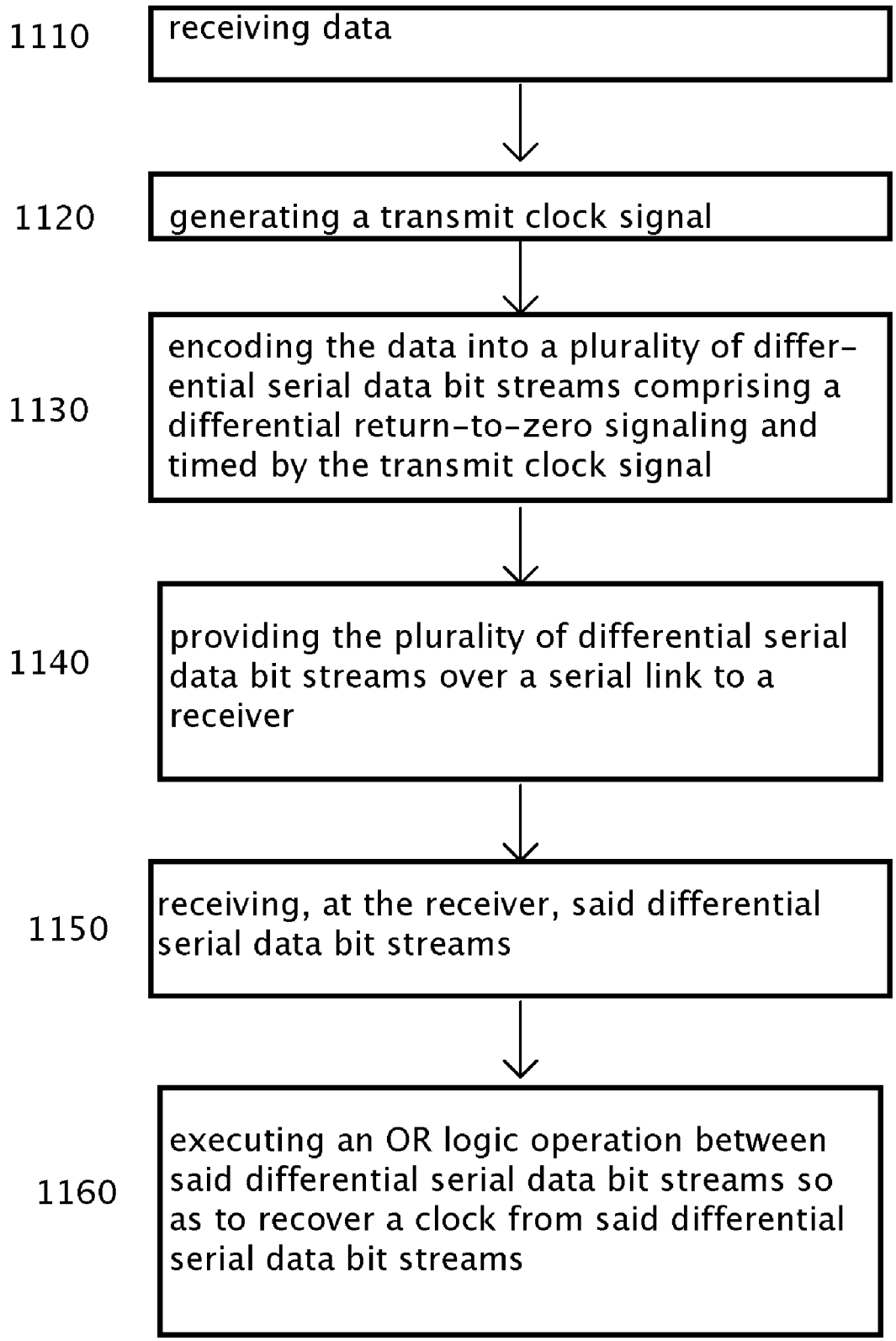

FIGS. 10 and 11 illustrate methods consistent with some embodiments of the present invention. In FIG. 10, a method includes steps of 1010, receiving differential serial data signals comprising a differential return-to-zero signaling, and 1020, executing an OR logic operation between said differential serial data signals so as to recover a clock from said differential serial data signals In FIG. 11, a method includes steps 1110, receiving data; 1120, generating a transmit clock signal; 1130, encoding the data into a plurality of differential serial data signals comprising a differential return-to-zero signaling and timed by the transmit clock signal; 1140, providing the plurality of differential serial data signals over a serial link to a receiver; 1150, receiving, at the receiver, said differential serial data signals; and 1160, executing an OR logic operation between said differential serial data signals so as to recover a clock from said differential serial data signals Advantages As noted above, by using differential RZ signaling over a serial link, embodiments of the present invention provide a reduction in power dissipation relative to NRZ signaling. Further, the clock recovery circuits embodied by the present invention recover clock from differential data via logic-gate like circuits and avoid expensive PLL-based CDR circuits.

Another advantage of the differential RZ link described in this disclosure is that, during operation, electromagnetic interference (EMI) produce by the link will occur at the link rate and its harmonics. In contrast, with NRZ signaling the EMI is spread over a wider frequency range in a data-dependent manner. With differential RZ signaling a pulse is produced regardless of whether a "1" or a "0" is transmitted. As a result the EMI is concentrated at the line rate and its harmonics. Having all the EMI at one frequency may be advantageous in applications such as mobile phones where the link rate can be chosen to be outside the radio-frequency (RF) bands used by the mobile phone.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A receiver circuit comprising:
   an input circuit for receiving differential serial data signals that form a differential return-to-zero signal, wherein said differential return-to-zero signal comprises a first signal that transmits a high bit on a first differential link and a second signal that transmits a low bit on a second differential link, wherein said first and second signals comprise duty cycles less than 50%; and
   a clock recovery circuit, coupled to said input circuit, said clock recovery circuit comprising a logic gate for receiving said differential return-to-zero signal and for generating a clock signal from said differential serial data signals.

2. The receiver circuit as set forth in claim 1, further comprising a T-type flip-flop, coupled to said clock recovery circuit, for receiving the clock signal of said clock recovery circuit and for generating a recovered clock signal by using the clock signal.

3. The receiver circuit as set forth in claim 2, further comprising a data recovery circuit that includes an integrate and dump circuit for receiving said recovered clock signal and said differential serial data signals and for generating a recovered data bit stream.

4. The receiver circuit as set forth in claim 3, wherein said recovered data bit stream is de-multiplexed.

5. The receiver circuit as set forth in claim 2, wherein said recovered clock signal comprises a nominal duty cycle of 50% at half an input data rate of the differential serial data signals 6. The receiver circuit as set forth in claim 1, further comprising a far-end termination circuit.

7. The receiver circuit as set forth in claim 1, wherein said logic gate comprises an OR logic gate.

8. The receiver circuit as set forth in claim 1, further comprising a low-power mode circuit for receiving a constant value on both differential serial data signals for a pre-determined period of time and for entering or exiting said low-power mode based on said constant value.

9. A circuit comprising:
   a first integrated circuit chip comprising a transmitter for receiving data and for generating differential serial data signals that form a differential return-to-zero signal, wherein said differential return-to-zero signal comprises a first signal that transmits a high bit on a first differential link and a second signal that transmits a low bit on a second differential link, wherein said first and second signals comprise duty cycles less than 50%;
   a second integrated circuit chip comprising:
   an input circuit for receiving said differential serial data signal; and
   a clock recovery circuit, coupled to said input circuit, comprising a logic gate for receiving said differential return-to-zero signal and for generating a clock signal from said differential return-to-zero signaling.

10. The circuit as set forth in claim 9, wherein said second integrated circuit chip further comprises a T-type flip-flop, coupled to said clock recovery circuit, for receiving the clock signal of said clock recovery circuit and for generating a recovered clock signal by using the clock signal.

11. The circuit as set forth in claim 10, wherein said second integrated circuit chip further comprises a data recovery circuit that includes an integrate and dump circuit for receiving said recovered clock signal and said differential serial data signals and for generating a differential recovered data bit stream.

12. The circuit as set forth in claim 10, wherein said second integrated circuit chip further comprises a transmitter circuit for transmitting data to said first integrated circuit using said recovered clock signal to generate timing for said transmitter circuit.

13. The circuit as set forth in claim 9, wherein said logic gate comprises an OR logic gate.

14. The circuit as set forth in claim 9, wherein said second integrated circuit chip further comprises a far-end termination circuit.

15. The circuit as set forth in claim 9, wherein:
   said first integrated circuit chip comprising a master low-power mode circuit for transmitting a constant value on a plurality of the differential data signals for a pre-determined period of time to signal activation of a low-power mode on a slave device; and
   said second integrated circuit chip comprising a slave low-power mode circuit for receiving said constant value on the plurality of the differential data signals for a pre-determined period of time and for entering or exiting said low-power mode based on said constant value.

16. A system comprising:
   a master circuit comprising a plurality of transceiver circuits to transmit and receive, over a plurality of serial links, differential serial data signals that form a differential return-to-zero signal, wherein said differential return-to-zero signal comprises a first signal that transmits a high bit on a first differential link and a second signal that transmits a low bit on a second differential link, wherein said first and second signals comprise duty cycles less than 50%, said master circuit comprising a single phase-locked loop to generate timing signals for said transceiver circuits;
   a plurality of slave circuits, each comprising:
   an input circuit for receiving said differential serial data signals; and
   a clock recovery circuit, coupled to said input circuit, comprising a logic gate for receiving said differential return-to-zero signal and for generating a clock signal from said differential return-to-zero signaling.

17. The system as set forth in claim 16, wherein said slave circuits further comprise a T-type flip-flop, coupled to said clock recovery circuit, for receiving the clock signal of said clock recovery circuit and for generating a recovered clock signal by using the clock signal.

18. The system as set forth in claim 17, wherein said slave circuits further comprise a data recovery circuit comprising an integrate and dump circuit for receiving said recovered clock signal and said differential serial data signals and for generating a recovered data bit stream.

19. The system as set forth in claim 17, wherein said slave circuits further comprise a transmitter circuit for transmitting data to said first integrated circuit using said recovered clock signal to generate timing for said transmitter circuit.

20. The system as set forth in claim 16, wherein said logic gate comprises an OR logic gate.

21. The system as set forth in claim 16, wherein said slave circuits further comprise a far-end termination circuit.

22. A method of recovering a clock from a serial stream of data, said method comprising:

receiving differential serial data signals that form a differential return-to-zero signal, wherein said differential return-to-zero signal comprises a first signal that transmits a high bit on a first differential link and a second signal that transmits a low bit on a second differential link, wherein said first and second signals comprise duty cycles less than 50%; and executing an OR logic operation between said differential serial data signals so as to recover a clock from said differential serial data signals.

23. A method of providing data and timing over a serial link and decoding said data, said method comprising:

receiving data;

generating a transmit clock signal;

encoding the data into a plurality of differential serial data signals that form a differential return-to-zero signal and are timed by the transmit clock signal, wherein said differential return-to-zero signal comprises a first signal that transmits a high bit on a first differential link and a second signal that transmits a low bit on a second differential link, wherein said first and second signals comprise duty cycles less than 50%;

providing the plurality of differential serial data signals over a serial link to a receiver;

receiving, at the receiver, said differential serial data signals;

executing an OR logic operation between said differential serial data signals so as to recover a clock from said differential serial data signals.

* * * * *